United States Patent [19]

Miyazono et al.

[11] Patent Number: 5,344,890
[45] Date of Patent: * Sep. 6, 1994

[54] ROOM-TEMPERATURE CURABLE EPOXY RESIN COMPOSITION

[75] Inventors: Tadafumi Miyazono, Mino; Koji Tabuchi, Hiroshima; Takegawa Masahiro, Suita, all of Japan

[73] Assignee: Nippon Paint Co., Ltd., Osaka, Japan

[ * ] Notice: The portion of the term of this patent subsequent to Jan. 11, 2011 has been disclaimed.

[21] Appl. No.: 975,255

[22] Filed: Nov. 12, 1992

[30] Foreign Application Priority Data

Nov. 13, 1991 [JP] Japan .................................. 3-326597

[51] Int. Cl.5 ............................................. C08F 30/08
[52] U.S. Cl. .................................. 525/326.5; 525/374; 525/379; 528/21; 528/27; 528/32; 528/41
[58] Field of Search ...................... 528/21, 27, 32, 41; 525/326.5, 374, 379

[56] References Cited

U.S. PATENT DOCUMENTS 3,842,019 10/1974 Kropp ................................. 528/105
4,923,945 5/1990 Isozaki et al. ......................... 528/16

Primary Examiner—John C. Bleutge
Assistant Examiner—Mark D. Sweet
Attorney, Agent, or Firm—Millen, White, Zelano & Branigan

[57] ABSTRACT

A room-temperature curable epoxy resin composition is disclosed. The composition contains (a) a resin component containing a polyepoxide function and an alkoxysilyl function, and (b) as a curing catalyst an amine, amide or urea salt of a superacid. The composition find its use in coating compositions, adhesives, sealants or potting compounds and casting compositions.

14 Claims, No Drawings

ROOM-TEMPERATURE CURABLE EPOXY RESIN COMPOSITION

BACKGROUND OF THE INVENTION

This invention relates to a novel epoxy resin composition which is curable at room temperature. The composition may find use, for example, in air-drying paints, adhesives and potting compounds of electric and electronic parts.

Epoxy resins are known to have excellent heat-resistant, adhesive, antichemical, electrical, mechanical and other properties and, therefore have extensively been used in various fields as adhesives, coatings, sealants, insulating materials, casting and molding compounds and the like.

Two systems are known to harden or cure the epoxy resins; one using a polyamine or polycarboxylic acid or anhydride hardener and the other being a self-polymerization system containing a cationic or anionic polymerization initiator generally referred to as "curing catalyst".

In our Japanese Patent Application No. 310001/1990 corresponding to U.S. Ser. No. 07/791,503, a room-temperature curable resin composition comprising (a) an acrylic polymer having a plurality of alicyclic epoxide functions, and (b) as a curing catalyst a Bronsted acid, a Lewis acid or an amine salt of superacid.

Our Japanese Patent Application No. 125055/1991 corresponding to U.S. Ser. No. 07/872,699 discloses a similar epoxy resin composition containing a substituted urea salt of superacid as a curing catalyst.

It has been found that these compositions are not fully satisfactory in certain properties such as water resistance.

U.S. Pat. Nos. 4,772,672, 4,923,930 and 4,923,945 disclose a low-temperature curable resin composition comprising a polymer having an oxirane ring and an alkoxysilyl group in the molecule and as a curing catalyst an aluminum or zirconium chelate. The curing reaction of this composition, however, takes a relatively long period of time at room temperature.

A need exists, therefore, for a room-temperature curable epoxy resin composition which exhibits improved water resistance and other properties compared with the above-discussed known compositions.

SUMMARY OF THE INVENTION

In accordance of the present invention, the above and other needs may be met by providing a room-temperature curable epoxy resin composition comprising (a) a resin component containing a polyepoxide function and an alkoxysilyl function, and (b) a catalytically effective amount of an amine, amide or urea salt of a superacid.

Typically, the resin component containing a polyepoxide function and an alkoxysilyl function is a polymer containing both functions in the molecule. Alternatively, the resin component may be a blend of two polymeric and/or monomeric components each bearing one of said functions, respectively.

As is well-known, the alkoxysilyl group is hydrolyzed to a silanol group with water and the resulting silanol group may be condensed with another silanol group to form a siloxane linkage. It is postulated that the curing mechanism of the composition of this invention involves, in addition to the above reaction, the ionic polymerization reaction of polyepoxide, a reaction between epoxide group and the silanol group, and a reaction of the epoxide or silanol group with another functional group if present. At any rate, the involvement of the silanol group in the curing mechanism renders the composition of the present invention to be reliably curable at room-temperature to give a cured product having improved properties particularly water resistance compared with the prior art compositions.

DETAILED DESCRIPTION OF THE INVENTION

Resin Component (a)

The resin component (a) may be either a polymer having a polyepoxide function and an alkoxysilyl function in the molecule or a blend of two polymeric and/or monomeric components each bearing one of said two functions. At least one component of the blend should be a polymer.

The polymer having a polyepoxide function and an alkoxysilyl function may be produced by copolymerizing an ethylenically unsaturated monomer having an epoxide function, an ethylenically unsaturated monomer having an alkoxysilyl function and, as an optional comonomer, another ethylenically unsaturated monomer.

Typical examples of monomers having a non-alicyclic epoxide function include glycidyl acrylate and glycidyl methacrylate.

Acrylic monomers having an alicyclic epoxide function may also be used to advantage. The term "alicyclic epoxide function" as used herein refers to an epoxide bridge formed between two adjacent carbon atoms of an alicyclic ring. Examples of these acrylic monomers may be classified into the following three groups.

I. (Meth)acrylate esters such as:
  3,4-epoxycyclohexylmethyl (meth)acrylate;
  2-(1,2-epoxy-4,7-methanoperhydroinden-5(6)-yl) oxyethyl (meth)acrylate;
  5,6-epoxy-4,7-methanoperhydroinden-2-yl (meth)acrylate:
  1,2-epoxy-4,7-methanoperhydroinden-5-yl (meth)acrylate;
  2,3-epoxycyclopentenylmethyl (meth)acrylate; and
  3,4epoxycyclohexylmethylated polycaprolactone (meth)acrylate of the formula:

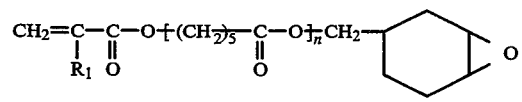

wherein $R^1$=H or $CH_3$ and n=1-10.

II. Adducts of (meth)acrylic acid with a polyfunctional alicyclic epoxy compound such as:
  3,4-epoxycyclohexyloxirane of the formula:

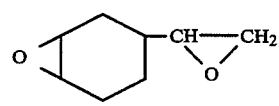

3', 4'-epoxycyclohexylmethyl 3,4-epoxycyclohexanecarboxy late of the formula:

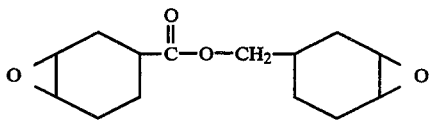

1,2,5,6-diepoxy-4,7-methanoperhydroindene of the formula:

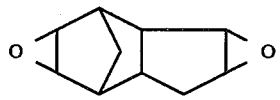

2-(3,4-epoxycyclohexyl)-3', 4'-epoxy-1,3-dioxane-5-spirocyclohexane of the formula:

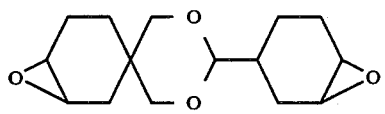

1,2-ethylenedioxy-bis(3,4-epoxycyclohexylmethane) of the formula:

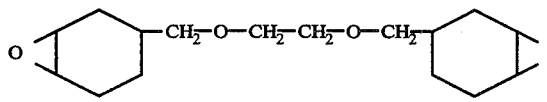

1,3-dimethyl-2,3-epoxycyclohexyloxirane of the formula:

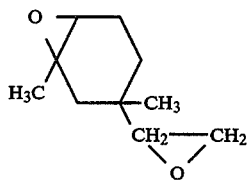

di-(2,3-epoxycyclopentyl)ether of the formula:

4', 5'-epoxy-2'-methylcyclohexylmethyl 4,5-epoxy-2-methylcyclohexanecarboxylate of the formula:

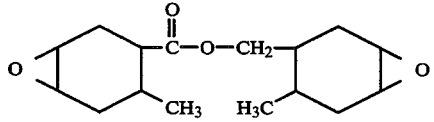

bis-(3,4-epoxycyclohexylmethyl)adipate;
bis-(4,5-epoxy-2-methylcyclohexylmethyl)adipate; and
ethyleneglycol bis(3,4-epoxycyclohexanecarboxylate).

III. Adducts of alicyclic epoxide alcohols with (meth)acrylisocyanate or isocyanatoethyl (meth)acrylate or m-isopropenyl-α, α-dimethylbenzylisocyanate such as:

N-(3,4-epoxycyclohexyl)methyloxycarbonyl-(meth)acrylamide;
N-(5,6-epoxy-4,7-methanoperhydroinden-2-yl)-oxycarbonyl-(meth)acrylamide; and
adduct of 3,4-epoxycyclohexylmethylated polycaprolactone with (meth)acrylisocyanate of the formula:

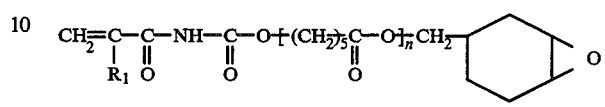

wherein $R^1$=H or $CH_3$ and n=1-10.

Examples of ethylenically unsaturated monomers having an alkoxysilyl function may be classified into the following four groups.

I. Alkoxysilylalkyl (meth)acrylates of the formula:

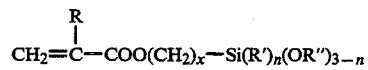

wherein R is H or $CH_3$, X is an integer, R' and R" are alkyl, and n is 0, 1 or 2.

Specific examples thereof are
γ-methacryloyloxypropyltrimethoxysilane,
γ-methacryloyloxypropylmethyldimethoxysilane,
γ-methacryloyloxypropyldimethylmethoxysilane,
γ-methacryloyloxypropyltriethoxysilane,
γ-methacryloyloxypropylmethyldiethoxysilane,
γ-methacryloyloxypropyltripropoxysilane,
γ-methacryloyloxypropylmethyldipropoxysilane,
γ-methacryloyloxypropyldimethylpropoxysilane,
γ-methacryloyloxypropyltributoxysilane,
γ-methacryloyloxypropylmethyldibutoxysilane,
γ-methacryloyloxypropyldimethylbutoxysilane and the like.

II. Adducts of acrylic or methacrylic acid with an epoxy group-containing alkoxysilane such as γ-glycidyloxypropyltrimethoxysilane or β-(3,4-epoxycyclohexyl)ethyltrimethoxysilane.

III. Adducts of a hydroxyalkyl (meth)acrylate such as 2-hydroxyethyl (meth)acrylate, 2-hydroxypropyl (meth)acrylate or 4-hydroxybutyl (meth)acrylate with an isocyanatoalkylalkoxyl-silane of the formula:
$OCN(CH_2) \times Si(R')_n(OR")_{3-n}$ wherein x, R' R" and n are as defined, such as
γ-isocyanatopropyltrimethoxysilane,
γ-isocyanatopropylmethyldimethoxysilane,
γ-isocyanatopropyltriethoxysilane, or
γ-isocyanatopropylmethyldiethoxysilane.

IV. Adducts of glycidyl (meth)acrylate with an aminoalkoxysilane such as
γ-aminopropyltrimethoxysilane,
N-(2-aminoethyl)- γ-aminopropylmethyldimethoxysilane,
N-(2-aminoethyl)- γ-aminopropyltrimethoxysilane,
γ-aminopropylmethyldiethoxysilane.

Examples of optional comonomers which may be copolymerizable with the epoxy group-containing monomer and the alkoxysilyl group-containing monomer include hydroxyl group-containing monomers such as 2-hydroxyethyl (meth)acrylate, 2-hydroxypropyl (meth)acrylate, 4-hydroxybutyl (meth)acrylate, 4-hydroxystyrene, 2-(2-hydroxyethyoxy)ethyl (meth)a- crylate, N-(2-hydroxyethyl)acrylamide, reaction products of polycaprolactone with (meth)acrylic acid (PLACCEL FA and PLACCEL FM sold by Daicel Chemical Industries, Ltd.), reaction products of polymethylvalerolactone with (meth)acrylic acid, polyethyleneglycol mono(meth)acrylate, polypropyleneglycol mono(meth)acrylate and polytetramethyleneglycol mono(meth)acrylate; and other monomers such as styrene, α-methylstyrene, methyl (meth)acrylate, ethyl (meth)acrylate, n-propyl (meth)acrylate, isopropyl (meth)acrylate, n-butyl (meth)acrylate, sec.-butyl (meth)acrylate, t-butyl (meth)acrylate, 2-ethylhexyl (meth)acrylate, lauryl (meth)acrylate, stearyl (meth)acrylate, vinyl acetate, vinyl propionate and the like.

The polymerization may be carried out by the solution polymerization technique using a conventional radical polymerization initiator. Examples of solvents used in the solution polymerization include aliphatic hydrocarbons such as cyclohexane, dipentene and hexane; aromatic hydrocarbons such as benzene, toluene, ethylbenzene and aromatic petroleum naphtha; halogenated hydrocarbons such as dichloromethane, dichloroethane, carbon tetrachloride, chloroform and dichlorobenzene; nitrated hydrocarbons such as nitrobenzene, nitromethane and nitroethane, ethers such as dioxane, tetrahydrofuran, and dibutyl ether; glycol ethers such as ethyleneglycol monomethyl ether, ethyleneglycol monoethyl ether, ethyleneglycol monobutyl ether, ethyleneglycol monoethyl ether acetate, diethyleneglycol monomethyl ether, diethyleneglycol monoethyl ether and diethyleneglycol monobutyl ether, ketones such as methyl ethyl ketone, ethyl isobutyl ketone, cyclohexanone, acetone and isophorone; alcohols such as methanol, ethanol, isopropanol, n-propanol, butanol, 2-ethylhexanol and cyclohexanol; esters such as ethyl acetate and butyl acetate; and mixture of these solvents.

The resulting acrylic polymer should have a number average molecular weight of greater than 1,000. The upper limit of molecular weight generally lies at about 500,000. A molecular weight ranging between about 3,000 and about 30,000 is preferable. If the molecular weight is too low, the mechanical strength of the resulting cured products is not satisfactory. Conversely, if the molecular weight is too high, the polymer is too viscous resulting in decreased workability of compositions containing the same.

As stated before, the resin component (a) may be a blend of polymeric and/or monomeric components each bearing one of the polyepoxide and alkoxysilyl functions, respectively.

Examples of the polymeric polyepoxide component include commercially available bisphenol epoxy resins. Homopolymers of acrylic monomers having an alicyclic epoxide function as discussed before or copolymers thereof with comonomers free from the epoxide and alkoxysilyl functions also as discussed before may be used to advantage.

Examples of the polymeric alkoxysilyl component include homopolymers of the above-discussed alkoxysilyl group-containing ethylenic monomers or copolymers thereof with the comonomer free from the epoxide and alkoxysilyl functions.

These homo- or copolymers may be produced using the standard solution polymerization technique as discussed before.

The polyepoxide component and the alkoxysilyl component need not be both polymeric in the blend but one of the two components may be monomeric.

Examples of the monomeric polyepoxide component or compound are polyfunctional alicyclic epoxy compounds listed before in connection with the preparation of an adduct with acrylic or methacrylic acid.

Examples of the monomeric alkoxysilyl component or compound are alkylalkoxysilanes, alkylarylalkoxysilanes, alkylalkoxysiloxanes, alkylarylalkoxysiloxanes and the like.

A compound having an epoxide group and an alkoxysilyl group in the molecule such as γ-glycidyloxypropyltrimethoxysilane and β-(3,4-epoxycyclohexyl)-ethyltrimethoxysilane may be used as an epoxide or alkoxysilyl monomeric component.

Using the above polymeric and/or monomeric components, the resin component (a) may be formulated. More specifically, the resin component (a) may comprise one of the following components:

(1) an acrylic copolymer having a polyepoxide function and an alkoxysilyl function in the molecule;
(2) a blend of a polyepoxide polymer and an alkoxysilyl compound;
(3) a blend of a polyepoxide polymer and an epoxyalkoxysilyl compound;
(4) a blend of a polyepoxide compound and an alkoxysilyl group-containing acrylic copolymer;
(5) a blend of an epoxy-alkoxysilyl compound and an alkoxysilyl group-containing acrylic copolymer;
(6) a blend of a polyepoxide polymer and an alkoxysilyl group-containing acrylic copolymer;
(7) a blend of the copolymer (1) and a polyepoxide compound;
(8) a blend of the copolymer (1) and an alkoxysilyl compound; and
(9) a blend of the copolymer (1) and an epoxy-alkoxysilyl compound.

Curing Catalyst (b)

The curing catalyst (b) used in the present invention is a superacid salt of a nitrogen-containing organic compound.

The term "superacid" as used herein is defined as an acid having an acidity stronger than a 100% sulfuric acid. See Kirk-Othmer, Enc. of Chem. Tech. (3rd Ed.), Vol. 11, pp. 295-296. Superacids may form a quarternary ammonium type salt not only with an amine having a relatively strong basicity but also with an amide or urea or a substituted urea having relatively weak basicity.

Preferable examples of the superacid are $HSbF_6$, $HBF_4$, $HAsF_6$, $HPF_6$ and $HCF_3SO_3$. Amine salts of such a superacid are well-known and a primary, secondary or tertiary amine such as diethylamine, triethylamine, dimethylaniline or pyridine may be used as a counterpart of the superacid. Amide salts and urea salts of superacid may be prepared by the method disclosed respectively in Japanese Kokai (Laid Open) Patent Application No. 119100/1975 and our Japanese Patent Application No. 125055/1991 corresponding to U.S. patent application Ser. No. 07/872,699, filed Apr. 24, 1992, the disclosure of which is incorporated herein by reference. These superacid salts may be prepared by reacting an alkali metal salt of a superacid with an amine, amide or urea in the form of its hydrochloride or in the presence of hydrogen chloride. This reaction may be performed, for example, by dissolving the cationic component in a suitable organic solvent in the form of its hydrochloride or under an acidic condition with HCl, then adding a solution of an alkali metal salt of a superacid. After removing precipitated alkali metal chloride by-product, the desired product may be recovered by evaporation.

Room-Temperature Curable Resin Composition

The composition of the present invention may contain as a chain-extender or cross-linker a minor amount of a polyhydric alcohol such as ethylene glycol, propylene glycol, 1,4-butanediol, 1,3-butanediol, 2,3-butanediol, diethylene glycol, dipropylene glycol, triethylene glycol, 1,5-pentanediol, 1,6-hexanediol, neopentyl glycol, 2,2,4-trimethylpentane-1,3-diol, glycerine, trimethylolpropane, trimethylene glycol, polyethylene glycol, polycaprolactone glycol, pentaerythritol, dipentaerythritol and the like. Also included are acryl polyols produced by polymerizing hydroxyl group-containing acrylic monomers such as 2-hydroxyethyl (meth)acrylate.

The curing catalyst (b) may generally be added in an amount of 0.1 to 10% by weight based on the total nonvolatile content of the resin component (a). The exact amount will vary depending upon the type of the resin component (a), properties desired in the cured products, the length of pot life as desired and other parameters. Within the above range it is possible to cure the composition at room temperature. If necessary, the composition of the present invention may be cured at an elevated temperature.

The resinous composition may contain a variety of conventional additives depending upon its indended use. For example, when used for coating purposes, the composition may contain pigments, solvents, light stabilizers, surface conditioners and the like. Other use or application includes adhesives, sealants or potting compounds, casting compounds and other resinous compositions where room temperature-curing is desired.

The following examples are intended to further illustrate the present invention without limiting thereto. All parts and percents therein are by weight unless otherwise indicated.

PRODUCTION EXAMPLE 1

Pyridine Hexafluoroantimonate (Curing Catalyst A)

A four necked flask equipped with a thermometer, stirrer and drip funnel was charged with 11.6 g of pyridine hydrochloride and 200 g of methanol. To this was added dropwise 26 g of $NaSbF_6$ in 150 g of methanol over 30 minutes with stirring and allowed to react at room temperature for 20 hours. Then the reaction mixture was filtered to remove NaCl by-product and evaporate to remove the solvent whereupon 29.8 g of the title compound was obtained as a white solid.

Assignment of IR spectra:
$Sb_6^-$: 663.4 $cm^{-1}$
Ammonium: 2600 $cm^{-1}$, 3200 $cm^{-1}$

PRODUCTION EXAMPLE 2

N,N-di-(2-ethylhexyl)-N'-n-butylurea hexafluoroantimonate (Curing Catalyst B)

A four necked flask equipped with a thermometer, stirrer and drip funnel was charged with 4.82 g of di-(2-ethylhexyl)amine and 100 g of ethyl acetate. To this was added dropwise a solution of 1.98 g of n-butylisocyanate in 30 g of ethyl acetate with stirring over 30 minutes while maintaining the inner temperature at 10° C. and allowed to react until the absorption of NCO group at 2240 $cm^{-1}$ disappeared IR spectrometrically. Then a mixture of 2.086 g of 35% hydrochloric acid and 50 g of methanol was added dropwise over 30 minutes and allowed to react at room temperature for 20 hours. To this was added dropwise a solution of 5.18 g of $NaSbF_6$ in 50 g of methanol over 30 minutes and allowed to react at room temperature for 20 hours. Then the reaction mixture was filtered to remove NaCl by-product and evaporated to remove the solvent. 11 g of the title compound was obtained as a pale reddish liquid.

Assignment of IR spectra:
$SbF_6^-$: 663.4 $cm^{-1}$
Urea : 3100–3400 $cm^{-1}$, 1600–1700 $cm^{-1}$
Ammonium: about 2500 $cm^{-1}$

PRODUCTION EXAMPLE 3

N-n-butyl-N'-octylurea tetrafluoroborate (Curing Catalyst C)

A four necked flask equipped with a thermometer, stirrer and drip funnel was charged with 2.58 g of octylamine and 200 g of ethyl acetate. To this was added dropwise a solution of 1.98 g of n-butylisocyanate in 30 g of ethyl acetate with stirring over 30 minutes while maintaining the inner temperature at 10° C. and allowed to react until the absorption of isocyanato group (2240 $cm^{-1}$) disappeared IR spectrometrically. After dissolving the solidified reaction product in 50 g of methanol, a mixture of 2.086 g of 35% hydrochloric acid and 50 g of methanol was added dropwise to the solution over 30 minutes and allowed to react at room temperature for 20 hours. Then a solution of 2.2 g of sodium tetrafluoroborate in 50 g of methanol was added dropwise over 30 minutes and allowed to react at room temperature for 20 hours. The reaction mixture was then filtered to remove NaCl by-product and evaporated to remove the solvent. 6.1 g of the title compound was obtained as a pale yellow liquid.

PRODUCTION EXAMPLE 4

N, N-dimethylacetamide hexafluorophosphate (Curing Catalyst D)

A four necked flask equipped with a thermometer, stirrer and drip funnel was charged with 258 g of N, N-dimethylacetamide and 50 g of methanol. To this was added dropwise a solution of 2.1 g of 35% hydrochloric acid in 50 g of methanol over 30 minutes and the mixture was stirred at room temperature for 20 hours. Then a solution of 3.36 g of $NaPF_6$ in 50 g of methanol was added dropwise over 30 minutes and allowed to react for 20 hours at room temperature. The reaction mixture was filtered to remove NaCl by-product and then evaporated to remove the solvent whereupon 5.3 g of the title compound was obtained as a pale yellow liquid.

PRODUCTION EXAMPLE 5

Alicyclic epoxy group-containing acrylic resin

A flask equipped with a thermometer, stirrer and drip funnel was charged with 500 g of xylene and 450 g of butyl acetate and heated to 120° C. To this was added dropwise the following monomer mixture over 3 hours.

| | |
|---|---|
| Styrene | 200.0 g |
| 3,4-epoxycyclohexylmethyl methacrylate | 419.3 g |
| n-Butyl acrylate | 163.5 g |
| n-Butyl methacrylate | 217.2 g |

| | |
|---|---:|
| t-Butylperoxy-2-ethylhexanoate | 37.0 g |
| Total | 1037.0 g |

After the addition, the mixture was stirred for an additional 30 minutes at 120° C. Then a solution of 5 g of t-butylperoxy-2-etylhexanoate in 50 g of butyl acetate was added dropwise over 30 minutes. Then the mixture was stirred for additional 1.5 hours and cooled down. A resin solution having a nonvolatile content of 50 % was obtained. The number average molecular weight of the resin measured by the GPC method was 5,600.

PRODUCTION EXAMPLE 6

Acrylic resin having alicyclic epoxy group and alkoxysilyl group

The following monomer mixture was polymerized as in Production Example 5 to obtain a resin solution having a nonvolatile content of 49.8%. The number average molecular weight of the resin measured by the GPC method was 5,400.

| | |
|---|---:|
| Styrene | 200.0 g |
| 3,4-Epoxycyclohexylmethyl methacrylate | 419.3 g |
| N-Butyl methacrylate | 236.0 g |
| γ-Methacryloxypropylmethyldimethoxysilane | 144.7 g |
| t-Butylperoxy-2-ethylhexanoate | 37.0 g |
| Total | 1037.0 g |

PRODUCTION EXAMPLE 7

Acrylic resin having glycidyl group and alkoxysilyl group

The following monomer mixture was polymerized as in Production Example 5 to obtain a resin solution having a nonvolatile content of 49.9%. The number average molecular weight of the resin measured by the GPC method was 5,500.

| | |
|---|---:|
| Styrene | 200.0 g |
| Glycidyl methacrylate | 303.8 g |
| n-Butyl methacrylate | 351.5 g |
| γ-Methacryloxypropylmethyldimethoxysilane | 144.7 g |
| t-Butylperoxy-2-ethylhexanoate | 37.0 g |
| Total | 1037.0 g |

PRODUCTION EXAMPLE 8

Alkoxysilyl group-containing acrylic resin

The following monomer mixture was polymerized as in Production Example 5 to obtain a resin solution having a nonvolatile content of 49.8%. The number average molecular weight of the resin measured by the GPC method was 5,600.

| | |
|---|---:|
| Styrene | 200.0 g |
| γ-Methacryloxypropylmethyldimethoxysilane | 144.7 g |
| n-Butyl methacrylate | 250.0 g |
| Isobutyl methacrylate | 405.3 g |
| t-Butylperoxy-2-ethylhexanoate | 37.0 g |
| Total | 1037.0 g |

EXAMPLES 1–6 AND COMPARATIVE EXAMPLES 1–4

Various compositions were formulated as indicated in Table 1, applied on a degreased polished steel plate to a dry film thickness of about 60 μm and allowed to stand at room temperature for 24 hours. The resulting films were tested for solvent resistance, pencil hardness and water resistance. The results are shown in Table 1.

TABLE 1

| Components, parts | Example 1 | Example 2 | Example 3 | Example 4 | Example 5 | Example 6 |
|---|---|---|---|---|---|---|
| Resin of Production EX. 5 | | 64 | | | | |
| Resin of Production EX. 6 | 80 | | 64 | | | |
| Resin of Production EX. 7 | | | | | 80 | |
| Resin of Production EX. 8 | | | | 64 | | |
| EPIKOTE 101(1) | | | | | | 32 |
| β-(3,4-Epoxycyclohexyl)-ethyltrimethoxysilane | | 8 | 8 | 8 | | |
| γ-Glycidyloxypropyl-trimethoxysilane | | | | | | 8 |
| Butyl acetate | 10 | 14 | 14 | 10 | 10 | 30 |
| Xylene | 10 | 14 | 14 | 10 | 10 | 30 |
| Catalyst A solution(2) | 10 | 10 | | | | |
| Catalyst B solution(3) | | | 10 | 10 | | |
| Catalyst C solution(4) | | | | | 10 | |
| Catalyst D solution(5) | | | | | | 10 |
| Solvent resistance(8) | Good | Good | Good | Good | Good | Good |
| Pencil hardness(9) | F | HB | H | B | HB | B |
| Water Resistance(10) | No Change | No Change | No Change | No Change | No Change | No Change |

| Component, parts | Comparative Example 1 | Comparative Example 2 | Comparative Example 3 | Comparative Example 4 |
|---|---|---|---|---|
| Resin of Production EX. 5 | 80 | | | 64 |
| Resin of Production EX. 6 | | | 80 | |
| Resin of Production EX. 8 | | 80 | | |
| β-(3,4-Epoxycyclohexyl)-ethyltrimethoxysilane | | | | 8 |
| Butyl acetate | 10 | 10 | 10 | 14 |

TABLE 1-continued

| | | | | |
|---|---|---|---|---|
| Xylene | 10 | 10 | 10 | 14 |
| Catalyst solution A(2) | 10 | 10 | | |
| Catalyst solution E(6) | | | 10 | |
| Catalyst solution F(7) | | | | 10 |
| Solvent resistance(8) | Good | Poor | Not good | Not good |
| Pencil hardness(9) | B | 3B | <6B | <6B |
| Water Resistance(10) | Changed | Changed | Changed | Changed |

Foot note of Table 1
(1)Bisphenol A epoxy resin produced by Yuka Shell Epoxy Co., Ltd.
(2)5 g of Curing Catalyst A in 95 g of MIBK.
(3)10 g of Curing Catalyst B in 90 g of xylene.
(4)10 g of Curing Catalyst C in 90 g of toluene.
(5)10 g of Curing Catalyst D in 90 g of butyl acetate.
(6)10 g of tris(acetylacetonato)aluminum in 90 g of toluene.
(7)10 g of tris(ethyl acetoacetato)aluminum in 90 g of toluene.
(8)Rubbing test with xylene-impregnated fabric at 50 reciprocations.
Good: No change
Poor: Scratched
Not Good: Dissolved or peeled off
(9)Accordingly to the method of JIS K 5400 6.14.
(10)The test specimen was soaked in a water bath at a constant temperature of 40° C. for 168 hours. Judgment was made whether a change in appearance such as blisters, peelings or whitening was observed or not.

What is claimed is:

1. A room-temperature curable epoxy resin composition comprising:
   (a) a resin component containing a polyepoxide function and an alkoxysilyl function, and
   (b) a catalytically effective amount of an amine, amide or urea salt of a superacid.

2. The room-temperature curable epoxy resin composition according to claim 1, wherein said resin component (a) comprises a polymer containing said polyepoxide function and said alkoxysilyl function in the polymer.

3. The room-temperature curable epoxy resin composition according to claim 2, wherein said polymer is a copolymer of an ethylenically unsaturated monomer having an epoxy group and an ethylenically unsaturated monomer having an alkoxysilyl group, or a copolymer of said epoxy group-containing monomer, said alkoxysilyl group-containing monomer and an ethylenically unsaturated monomer free from the epoxy and alkoxysilyl groups.

4. The room-temperature curable epoxy resin composition according to claim 1, wherein said resin component (a) comprises a blend of a polyepoxide polymer and an alkoxysilyl group-containing polymer.

5. The room-temperature curable epoxy resin composition according to claim 4, wherein said polyepoxide polymer is an epoxy resin, a homopolymer of an ethylenically unsaturated monomer having an epoxy group or a copolymer thereof with an ethylenically unsaturated monomer free from said epoxy and alkoxysilyl groups.

6. The room-temperature curable epoxy resin composition according to claim 4, wherein said alkoxysilyl group-containing polymer is a homopolymer of an ethylenically unsaturated monomer having an alkoxysilyl group or a copolymer thereof with an ethylenically unsaturated monomer free from said epoxy and alkoxysilyl groups.

7. The room-temperature curable epoxy resin composition according to claim 1, wherein said resin component (a) comprises a blend of a monomeric polyepoxide compound and a polymer containing an alkoxysilyl group.

8. The room-temperature curable epoxy resin composition according to claim 7, wherein said monomeric polyepoxide compound is an alicyclic polyepoxide compound.

9. The room-temperature curable epoxy resin composition according to claim 7, wherein said alkoxysilyl group-containing polymer is a homopolymer of an ethylenically unsaturated monomer having an alkoxysilyl group or a copolymer thereof with an ethylenically unsaturated monomer free from said epoxy and alkoxysilyl groups.

10. The room-temperature curable epoxy resin composition according to claim 1, wherein said resin component (a) comprises a blend of a polyepoxide polymer and a monomeric alkoxysilyl compound.

11. The room-temperature curable epoxy resin composition according to claim 10, wherein said polyepoxide polymer is an epoxy resin, a homopolymer of an ethylenically unsaturated monomer having an epoxy group or a copolymer thereof with an ethylenically unsaturated monomer free from said epoxy and alkoxysilyl groups.

12. The room-temperature curable epoxy resin composition according to claim 10, wherein said monomeric alkoxysilyl compound is an alkylalkoxysilane, an alkylarylalkoxysilane, an alkylalkoxysiloxane or an alkylarylalkoxysiloxane.

13. The room-temperature curable epoxy resin composition according to claim 1, wherein said resin component (a) further comprises a polyhydric alcohol in an amount effective for chain-extending or crosslinking the composition.

14. The room-temperature curable epoxy resin composition according to claim 1, wherein said superacid salt is a hexafluoroantimonate, a tetrafluoroborate, a hexafluoroarsenate, a hexafluorophosphate or a trifluorosulfonate.

* * * * *